United States Patent [19]

Matsuo et al.

[11] 4,431,543
[45] Feb. 14, 1984

[54] METHOD OF REMOVING PHOSPHORUS FROM ORGANIC WASTE LIQUIDS

[75] Inventors: Yoshitaka Matsuo, Chigasaki; Toshihiro Tanaka; Akiko Miya, both of Fujisawa, all of Japan

[73] Assignee: Ebara Infilco Kabushiki Kaisha, Japan

[21] Appl. No.: 366,302

[22] Filed: Apr. 7, 1982

[30] Foreign Application Priority Data

Apr. 13, 1981 [JP] Japan .................................. 56-54281

[51] Int. Cl.³ .............................. C02F 3/12; C02F 3/30
[52] U.S. Cl. .................................. 210/605; 210/607; 210/624; 210/626; 210/631; 210/903; 210/906
[58] Field of Search ................ 210/605, 607, 622–626, 210/631, 906, 903, 724, 714, 763

[56] References Cited

U.S. PATENT DOCUMENTS

| | | | |
|---|---|---|---|
| 3,386,911 | 6/1968 | Albertson | 210/624 |
| 4,056,465 | 11/1977 | Spector | 210/605 |
| 4,141,822 | 2/1979 | Levin et al. | 210/906 |
| 4,271,026 | 6/1981 | Chen et al. | 210/605 |

FOREIGN PATENT DOCUMENTS

| | | | |
|---|---|---|---|
| 53-101842 | 9/1978 | Japan | 210/906 |
| 56-65693 | 6/1981 | Japan | 210/906 |
| 56-87496 | 7/1981 | Japan | 210/626 |

*Primary Examiner*—Peter A. Hruskoci
*Attorney, Agent, or Firm*—Steinberg & Raskin

[57] ABSTRACT

Phosphorus, nitrogen and BOD are removed from organic waste liquid containing the same by mixing the organic waste liquid with activated sludge which is substantially free of oxygen, nitric acid and nitrous acid and subjecting the mixture to the action of the activated sludge under anaerobic conditions which forms a mixture of a liquid rich in soluble phosphorus and an activated sludge low in phosphorus. The sludge and liquid are separated. A portion of the liquid is subjected to solid-liquid separation to form a liquid high in phosphorus and a sludge low in phosphorus. This latter sludge is, along with the other portion of the liquid and the sludge from which the liquid has been initially separated are mixed with oxygen, in the presence of nitric acid or nitrous acid and subjected to aerobic biological oxidation. This results in the formation of a liquid low in phosphorus and an activated sludge. The activated sludge is used as the activated sludge free of oxygen, nitric acid and nitrous acid in the first stage of the process. The liquid high in phosphorus from the portion subjected to solid-liquid separation of the separated liquid is subjected to chemical removal of the soluble phosphorus therein.

10 Claims, 2 Drawing Figures

METHOD OF REMOVING PHOSPHORUS FROM ORGANIC WASTE LIQUIDS

BACKGROUND OF THE INVENTION

Municipal sewage and organic industrial effluents are usually treated by standard activated sludge process for the removal of impurities. However, the standard processes result in incomplete removal of nitrogen and phosphorus, the same being present in amounts greater than the BOD, and as a result the treated liquid brings about eutrophication of lakes and bays with consequent severe damage to fishing and tourism.

It has thus become a matter of urgent necessity to develope a technology for the removal of phosphorus and nitrogen together with BOD from waste liquids in a stable, effective and economical manner.

With respect to the removal of nitrogen, biological nitrification-denitrification has established itself as an important process with the development of circulated nitrification-denitrification process which utilizes BOD in waste liquid at its maximum.

The known methods for removal of phosphorus which is present in the form of soluble phosphate $[PO_4{}^{3-}]$ include coagulating sedimentation which employs ferric chloride $[FeCl_3]$, aluminum sulfate $[Al_2(SO_4)_3]$, or slaked lime $[Ca(OH)_2]$ as a coagulant. This process, however, requires a large quantity of coagulant if the process is to decrease the concentration of phosphorus in the treated liquid to a sufficiently low value to prevent eutrophication.

Using coagulant in large quantities not only makes the process uneconomical, but also makes it difficult to treat the difficult-to-dewater sludge resulting from the process. Due to these problems the coagulating sedimentation process has reached its limits, and there has arisen a demand for effective, economical processes for removal of phosphorus to replace the coagulating sedimentation process.

Promising processes for this purpose are: (1) "catalytic dephosphorization process" working on the principle of formation of ore of phosphorus, and (2) "biological dephosphorization process" (modified activated sludge process) to remove phosphorus and BOD together by utilizing phosphorus metabolism performed by special microorganisms.

The catalytic dephosphorization process having many advantages is essentially a technique which is suitable for treating waste liquids containing phosphorus in high concentrations. Therefore, it is not economical when applied to municipal sewage containing phosphorus in low concentrations, for example in concentrations not exceeding about 10 mg/l.

The first reason for the lack of economy in such process is the considerable consumption of calcium agent which is required in very large quantities. The second reason is that the pH adjustment of the liquid, which is necessary for the process, is quite expensive.

Thus, despite the advantages, the catalytic dephosphorization process is not suitable for treating waste liquids containing phosphorus in low concentrations and the process cannot therefore be applied directly to municipal sewage treatment.

On the other hand, the biological dephosphorization process utilizes a conventional activated sludge system provided with an anaerobic tank in which special microorganisms, referred to as dephosphorizing bacteria, that perform phosphorus metabolism are selected predominantly from among activated sludge microorganisms, and the microorganisms are used to remove phosphorus together with organic substances, and in some cases, to also carry out denitrification.

Two biological dephosphorization processes have been proposed which utilize the phosphorus metabolism characteristic of dephosphorization bacteria. One process is the activated sludge process which utilizes a dephosphorization tank which is commercialized under the name of "Phostrip Process". The principle of this process is that the phosphorus contained in low concentrations in a large quantity of waste liquid is concentrated into a small quantity of liquid by activated sludge containing dephosphorization bacteria and the phosphorus is removed by the coagulating sedimentation process (in most cases using calcium hydroxide as coagulant).

However, the process requires a long residence time of the sludge in the dephosphorization tank, which is kept under anaerobic conditions, and it has been found that leaving this sludge under anaerobic conditions for a long time tends to kill microorganisms other than the dephosphorization bacteria so that the sludge with the killed microorganisms bubbles anomalously on return to the aeration tank, which causes operational difficulties.

Another biological dephosphorization process using phosphorus metabolism of dephosphorization bacteria is known as the anaerobic-aerobic activated sludge process.

According to this process, a common activated sludge facility is provided before the aeration tank with a small-volume anaerobic tank which does not permit both $O_2$ and $NO_x{}^-$ to be present. In this additional tank, waste liquid to be treated is mixed with activated sludge returned from the final sedimentation tank. At least a part of the BOD in the waste liquid is taken into the activated sludge in a non-oxidative manner by the aid of a characteristic phosphorus metabolism and organic substance metabolism performed by dephosphorization bacteria contained in activated sludge, while phosphorus is released from the activated sludge to the waste liquid. The resulting liquid mixture containing soluble phosphorus in high concentrations is introduced to the subsequent aeration tank, in which BOD remaining in the solution and intracellular organic substances taken and stored by activated sludge bacteria are biologically oxidized and simultaneously, phosphorus contained in the waste liquid and phosphorus present in the solution are caused to be absorbed again by activated sludge.

In the anaerobic-aerobic activated sludge process, an anaerobic tank for selecting dephosphorization bacteria is installed at the entrance of the waste liquid to be treated, and it is used for both release of phosphorus and intake of BOD. Therefore, this process permits release of phosphorus and selection of dephosphorization bacteria more actively than the activated sludge process with a dephosphorization tank. Nevertheless, removal of phosphorus is less stable and the ultimate phosphorus content in the treated waste liquid is higher than the activated sludge process with a dephosphorization tank.

According to the conventional anaerobic-aerobic activated sludge process, the activated sludge circulating in the system releases and absorbs phosphorus very actively. However, the prime mover for substantial phosphorus removal is performed only by the activated sludge that grows in the aeration tank, the quantity of the activated sludge corresponding to the quantity of the excess activated sludge. Therefore, the removal of phosphorus is unstable even when the waste liquid fluctuates only a little in quantity, quality, and temperature.

It is thus clear that the conventional anaerobic-aerobic activated sludge process is not satisfactory and there are several limitations in the process. However, it does have advantages in that release of phosphorus in the aerobic tank is rapid and certain, the phosphorus released in the anaerobic tank is absorbed by the activated sludge even when absorption of phosphorus in the aeration tank is poor, and the resulting activated sludge can relatively easily be subjected to sedimentation and concentration.

However, despite these advantages, the conventional anaerobic-aerobic activated sludge process does not remove phosphorus together with BOD in a sufficiently economical and efficient manner form organic waste liquids, such a municipal sewage, which contain phosphorus in low concentrations.

SUMMARY OF THE INVENTION

It is accordingly a primary object of the present invention to provide an improvement of the anaerobic-aerobic activated sludge process so as to provide efficient removal of phosphorus in an economical manner from waste liquids having a low phosphorus content.

It is a further object of the present invention to provide for the efficient removal of phosphorus from waste liquids having a low BOD/phosphorus ratio of, for example, not more than 30, by combining the conventional anaerobic-aerobic activated sludge process with chemical phosphorus removal.

It is yet a further object of the present invention to provide a process for the easy concentration of waste liquids containing phosphorus in low concentrations to a small volume of liquid containing phosphorus in high concentrations with the aide of activated sludge, utilizing facilities which are simpler than those used for conventional activated sludge process with a dephosphorization tank.

With the above and other objects in view, the present invention mainly comprises the removal of phosphorus, nitrogen and BOD from organic waste liquid, the process comprising in a first stage mixing the organic waste liquid with activated sludge which is substantially free of oxygen, nitric acid and nitrous acid and subjecting the same to anaerobic conditions, resulting the formation of a mixture of a liquid rich in soluble phosphorus and an activated sludge low in phosphorus, in a second stage separating the activated sludge from the liquid of the first stage, in a third stage dividing the liquid from the second stage into a first portion and a second portion, in a fourth stage subjecting the secord portion of the liquid from the third stage to solid-liquid separation to obtain a sludge and a liquid high in phosphorus content, in a fifth stage subjecting the sludge from the first stage, the first portion of liquid from the third stage and the sludge from the fourth stage to aerobic oxidation, in a sixth stage subjecting the liquid high in phosphorus from the fourth stage to chemical dephosphorization to form a mixture of liquid low in phosphorus and activated sludge, and in a seventh stage introducing said activated sludge from the sixth stage into the first stage for anaerobic action with organic waste liquid.

Thus, in accordance with the present invention, the first feature is the modification of the conventional anaerobic-aerobic activated sludge process in which the mixture liquid discharged from the anaerobic tank is introduced into the aeration or denitrification tank. According to the modification, the flow is partly branched to the intermediate solid-liquid separating process.

The second feature of this invention is that a liquid containing phosphorus in much higher concentrations than the waste liquid is separated from the branched mixture liquid and simultaneously intermediate concentrated sludge containing phosphorus in low concentrations with concomitant soluble phosphorus in comparatively small quantities is obtained in the intermediate solid-liquid separating process.

The third feature of this invention is that the intermediate concentrated sludge together with the remainder of the mixture liquid or the main flow of the mixture liquid discharged from the anaerobic tank are introduced to the aeration tank or denitrification tank, in which, or in the subsequent nitrification tank, the soluble phosphorus contained in the main flow of the mixture liquid and a small volume of phosphorus concomitant with the intermediate concentrated sludge are absorbed by activated sludge, whereby complete phosphorus removal is accomplished.

The fourth feature of this invention is that the separated liquid containing phosphorus in high concentrations which has been obtained in the intermediate solid-liquid separating process undergoes a chemical process for removing phosphorus.

The fifth feature of this invention is that the dephosphorized liquid obtained in the above-mentioned manner is preferably introduced to the anaerobic tank, aeration tank, denitrification tank, and subsequent tank, if BOD and/or phosphorus remains unremoved in the dephosphorized liquid.

The sixth feature of this invention is that catalytic dephosphorization is the preferred process for the chemical phosphorus removal from the separated liquid containing phosphorus in high concentrations.

The seventh feature of this invention is that the separated liquid containing phosphorus in high concentrations is, if required, subjected to biological oxidation treatment prior to being treated by the chemical phosphorus removing process.

The eighth feature of this invention is that the concentrated sludge obtained in the last solid-liquid separating process is, if required, partly returned directly to the aeration tank.

It is preferred in accordance with the present invention that in the above described process, in dividing the liquid from the second stage the first portion is a major portion and the second portion is a minor portion. This major and minor division permits easy operation of the process.

BRIEF DESCRIPTION OF THE DRAWINGS

For a fuller understanding of the invention, reference is had to the following description taken in connection with the accompanying drawings, in which.

DESCRIPTION OF PREFERRED EMBODIMENTS

Figure 1:
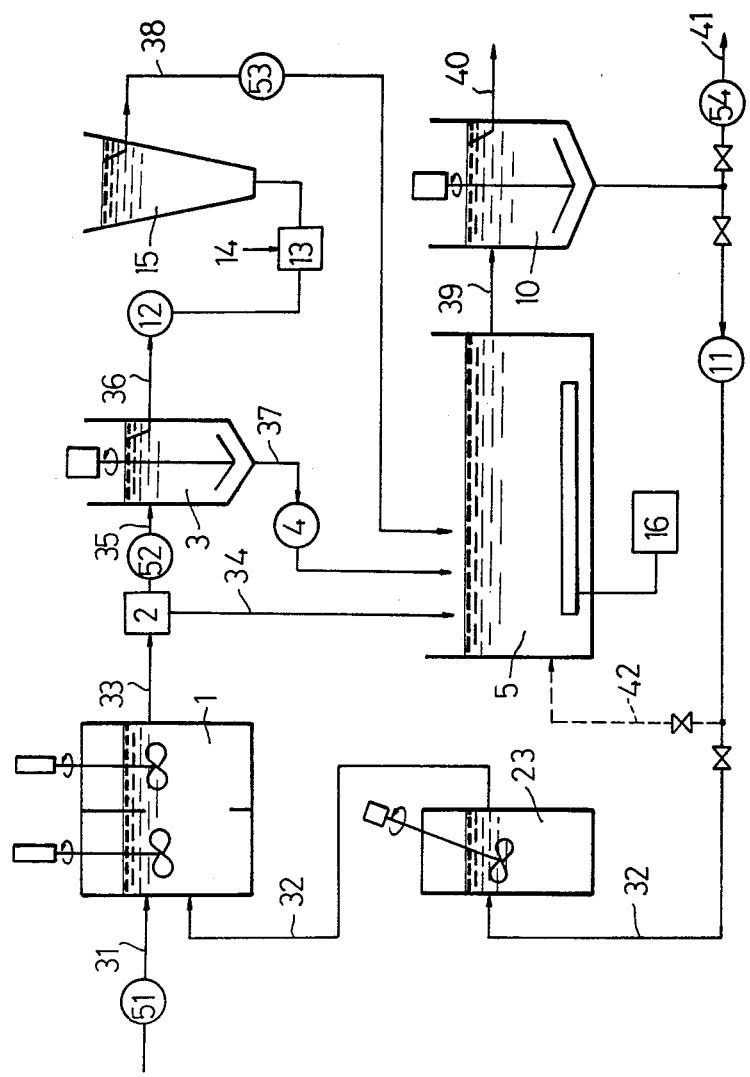
FIG. 1 is a typical flow sheet of one embodiment of the present invention for the removal of BOD and phosphorus by the activated sludge process of this invention.

Referring now to FIG. 1, waste liquid 31, such as municipal sewage to be treated, which has passed through a sedimentation tank (not shown), enters anaerobic tank 1 for mixing with the activated sludge 32 returned from the final sendimentation tank 10 for solid-liquid separation. The anaerobic tank is kept in an "anaerobic state" in which microorganisms cannot perform respiration and metabolism due to the substantial absence of dissolved oxygen [DO] and $NO_x^-$ are not definitely specified, but they should preferably be kept at such a level that the oxidation-reduction potential [ORP] is not higher than $-130$ mV.

The returned sludge 32 often contains $NO_x^-$. A small amount of $NO_x^-$ is consumed immediately on mixing with the waste liquid 31, but a large amount of $NO_x^-$ is not desirable because it adversely affects the anaerobic state of the anaerobic tank 1. To cope with this problem, it is desirable to extend the residence time of sludge in the final sedimentation tank 10, or to provide the route of sludge return with the return sludge storage tank 23 in which aeration is not performed or slight aeration is performed for denitrification. If $NO_x^-$ still enters, then the anaerobic tank 1 should be divided into two or more compartments as illustrated, or the anaerobic tank 1 should be elongated in the flow direction so that the liquid in the tank is mixed in the form of false plug flow, whereby an anaerobic state is created at least in the rear half of the anaerobic tank 1. In such case, BOD in the waste liquid (mixed liquid in the tank) is consumed partly for denitrification and the selection of dephosphorization bacteria becomes weak. Therefore, the best procedure is to completely shut out the entrance of $NO_x^-$.

The anaerobic tank 1 may be of the same structure as conventionally used for the denitrification tank for the nitrification-denitrification process. In order to prevent the entrance of $O_2$ from the atmosphere and to prevent the diffusion of odors from the waste liquid, the anaerobic tank should preferably be of a structure which permits hermetic sealing, however such structure is not specifically required according to the invention. The mixing is performed by gas agitation, mechanical agitation, liquid flow agitation, etc., which are used for the denitrification tank.

If the anaerobic tank 1 as specified above is connected to the subsequent aeration tank 5, an activated sludge facility is formed. In such facility, the resulting activated sludge contains dephosphorization bacteria as the main variety of microorganisms. In the anaerobic tank 1, the bacteria in the activated sludge assimilate, nonoxidatively, at least a part of the BOD contained in the waste liquid and store it as the intracellular organic substance and simultaneously release phosphorus (mostly polyphosphoric acid granules) in the form of soluble phosphorus from cells into the waste liquid.

In the anaerobic tank 1, the release of phosphorus from the activated sludge is performed rapidly and simultaneously with the assimilation of BOD. In the case of treating municipal sewage as the waste liquid, about 5 times as much phosphorus as that contained in the waste liquid is released within 2 hours, although there is a slight difference depending on the conditions. As a result, the soluble phosphorus in the mixture liquid increases in concentrations by about 6 times as compared with the waste liquid, and the content of phosphorus in the activated sludge decreases accordingly. In other words, the mixture liquid 33 discharged from the anaerobic tank contains the activated sludge which has released phosphorus and consequently contains phosphorus at a low level and soluble phosphorus in an amount corresponding to the sum of the released phosphorus and the phosphorus contained in the waste liquid.

If this were a conventional anaerobic-aerobic activated sludge process, the liquid mixture 33 discharged from the anaerobic tank 1 would be directly introduced into the aeration tank 5. In other words, the aeration tank 5 would be loaded with the activated sludge which has released phosphorus and all of the soluble phosphorus (released phosphorus and phosphorus in the waste liquid) in the effluent from the anaerobic tank.

According to the process of this invention, however, the soluble phosphorus contained in the mixture liquid 33 discharged from the anaerobic tank is partly separated from the activated sludge which has released phosphorus, so that the load of the soluble phosphorus on the aeration tank is reduced. This procedure is described below.

The mixture liquid 33 discharged from the anaerobic tank flows into the distribution tank 2 which separates the flow into the main flow 34 of mixture liquid which goes directly to the aeration tank 5 and the branched flow 35 of mixture liquid. The branched flow 35 of mixture liquid is introduced to the intermediate sedimentation tank 3 which performs intermediate solid-liquid separation. The liquid 36 separated by the sedimentation tank 3 contains phosphorus in high concentrations. The concentrated sludge 37 settling in the sedimentation tank 3 which has released phosphorus contains concomitant soluble phosphorus in a relatively small quantity. This intermediate solid-liquid separation procedure is essential and most important in the present invention. It need not necessarily be gravity sedimentation as shown in the drawing. Dissolved-air flotation and centrifugal sedimentation and other mechanical sedimentation may be used. The activated sludge formed in the activated sludge process or in the nitrification-denitrification process by this invention are generally easy to settle and can be treated satisfactorily by common gravity sedimentation. The intermediate concentrated sludge 37 obtained in the intermediate sedimentation tank 3 flows into the aeration tank 5 through the pump 4, and the separated liquid 36 is transferred to the step for removing phosphorus in a chemical manner.

The concentration of phosphorus contained in the separated liquid 36 is equal to or slightly higher than that of soluble phosphorus contained in the mixture liquid 33 discharged from the anaerobic tank. It depends on the quality of waste liquid 31 and the operating conditions of the anaerobic tank 1. In the case of average municipal sewage containing about 5 mg/l as P, the phosphorus concentrations will be 25 to 30 mg/l as P.

According to the present invention, the catalytic dephosphorization process is preferably used as the chemical process for removing phosphorus from the separated liquid 36 containing phosphorus in comparatively high concentrations, although other processes are not precluded. The reason for this is that the catalytic dephosphorization process requires no sludge treatment and recovers phosphate mineral resources and is suitable for treating liquids containing phosphorus in high concentrations. In the case where the waste liquid 31 is municipal sewage, the separated liquid 36 contains phosphorus in high concentrations, whereas alkaline matter is low at 120 mg/l as $CaCO_3$ as compared with the phosphorus concentration. Therefore, more than 90% of the phosphorus can be removed easily simply by adding $Ca(OH)_2$ in an amount twice as much (in molar ratio) as the phosphorus, without alkalinity adjustment which is usually required. Even if alkalinity adjustment is required, the expense for it is very small because the separated liquid 36 is reduced in volume to 3 to 25% of the waste liquid charged.

In the embodiment as shown in FIG. 1, the separated liquid 36 is introduced, through pump 12, without undergoing alkalinity adjustment, to the calcium agent mixing tank 13 where the separated liquid 36 is mixed with a calcium agent 14 such as $Ca(OH)_2$ and $CaCl_2$, and then to the dephosphorization tower 15. The dephosphorization tower 15 is constructed and operated in the same manner as for the catalytic dephosphorization process. In the embodiment shown in FIG. 1, a dephosphorization tower of the fluidized bed type is used because the separated liquid 36 contains phosphorus in high concentrations and sufficient removal of phosphorus is possible with a fluidized bed which is easy to maintain. Needless to say, the type of the dephosphorization tower 15 is not limited to a fluidized bed type, and it may be of the fixed bed type or a combination of fluidized bed and fixed bed. The separated liquid 36 should preferably have pH 6 to 11 when it comes into contact with the dephosphorization tower filled with phosphate minerals.

After removal of phosphorus by a chemical process, the separated liquid 36 is now the dephosphorized treated liquid 38, which may be discharged as such, if permitted, or may undergo further treatment in another system, or may be returned to either the anaerobic tank 1 or the aeration tank 5 of the anaerobic-aerobic activated sludge process. In the embodiment shown in FIG. 1, the treated liquid 38 flows into the aeration tank 5 for removal of BOD and remaining phosphorus.

The aeration tank 5 receives the main flow mixture liquid 34, the intermediate concentrated sludge 37, and, in some cases, the chemically dephosphorized treated liquid 38. The aeration tank 5 may be constructed and operated with the same technology as used in the conventional activated sludge process. This tank should have such configuration as to bring about a false plug flow rather than complete mixing, so that short pass of influent liquid is prevented and easy-to-settle activated sludge is formed. To meet such requirements, a rectangular tank elongated in the flow direction or a partitioned rectangular tank may be used. The main flow mixture liquid 34 should preferably be admitted into the aeration tank at a point farthest from the outlet of the aeration tank so that its residence time in the tank is maximized. However, the intermediate concentrated sludge 37 and the chemically dephosphorized treated liquid 38 need not necessarily to be admitted into the aeration tank at the same influent point as the main flow mixture liquid 34.

The mixture liquid in the aeration tank should be adjusted to pH 6.0 to 9.0, preferably pH 6.5 to 8.5. Dissolved oxygen [DO] should exist in concentrations higher than 2 mg/l throughout the tank. However, it is inevitable that DO concentrations are lower than that at the vicinity of the influent point for the main flow mixture liquid 34 and the intermediate concentrated sludge 37. Aeration in the aeration tank may be carried out by methods employed in the conventional activated sludge process. The embodiment as shown in FIG. 1 employs the air blow system which blows air fed from the blower 16 in the form of fine bubles into the mixture liquid. However, aeration may be accomplished by other mechanical systems. Oxygen aeration may be employed in which air may be replaced by oxygen.

On entrance of the main flow mixture liquid 34 and the intermediate concentrated sludge 37 into the aeration tank 5 equipped as above mentioned, the bacteria in the activated sludge in both flows perform active respiration and metabolism, biologically oxidizing BOD outside cells and intracellular organic substance reserves and simultaneously assimilating soluble phosphorus outside cells and storing it in cells in the form of polyphosphoric acid granules. The absorption of soluble phosphorus is proportional in quantity and rate to the difference between the critical phosphorus content in activated sludge and the phosphorus content at a given point. Therefore, the activated sludge with phosphorus released, which is contained in the main flow mixture liquid 34, and the intermediate concentrated sludge 37 vigorously absorbs soluble phosphorus from the solution immediately after entrance into the aeration tank. However, the rate of phosphorus absorption decreases as the phosphorus content in the activated sludge increases, or, the phosphorus absorption capacity becomes small.

In the case of the conventional anaerobic-aerobic activated sludge process in which the mixture liquid 33 discharged from the anaerobic tank would all be admitted as such into the aeration tank 5, the activated sludge becomes almost saturated in its phosphorus absorption capacity when it has reabsorbed the phosphorus discharged in the anaerobic tank 5, so that absorption of additional phosphorus contained in the waste liquid 31 has to resort to a small increment in the aeration tank 5 or equal to the phosphorus absorption capacity of the excess sludge. Therefore, phosphorus absorption in the latter half of the aeration tank 5 according to the prior art is very slow and substantial phosphorus removal is not carried out.

In accordance with the present invention this problem has been solved by admitting into the aeration tank 5 the intermediate concentrated sludge 37 with phosphorus released, which contains concomitant soluble phosphorus in a relatively small quantity as compared with its phosphorus absorption capacity. The activated sludge contained in the intermediate concentrated sludge 37 is originally the same as the activated sludge contained in the branched flow mixture liquid 35. However, as a result of the solid-liquid separation process in the intermediate sedimentation tank 3, the concomitant soluble phosphorus is decreased as much as the phosphorus introduced together with the separated liquid 36 to the chemical phosphorus removing process. Therefore, this activated sludge still has a surplus phosphorus absorption capacity even after it has reabsorbed the concomitant soluble phosphorus in the aeration tank 5, and it, together with the activated sludge grown in the aeration tank 5, substantially absorbs phosphorus contained in the waste liquid 31. Owing to the intermediate concentrated sludge 37 having such ability, the phosphorus absorption in the aeration tank 5 is much faster than that in the conventional anaerobic-aerobic activated sludge process, particularly in the latter half of the aeration tank. Therefore, according to the process of the present invention, removal of phosphorus is accomplished with certainty even with the aeration tank 5 having a comparatively small capacity, and the concentration of phosphorus in the treated liquid 40 is invariably low.

According to the process of this invention, the capacity of the aeration tank 5 is often determined by the BOD sludge load (F/M) as in the ordinary activated sludge process, rather than the phosphorus load. In the conventional anaerobic-aerobic activated sludge process, phosphorus removal resorts entirely to the phosphorus absorption capacity of the excess sludge, and consequently it is necessary to operate the system in such manner that excess sludge is formed in large quantities. Therefore, the system is often operated with an excessively high BOD load and reduced sludge age, with the result that the removal of BOD, which is the original object of the activated sludge process, becomes insufficient and the excess sludge generated is not completely stable.

According to the process of this invention, however, it is possible to maintain a stable treatment and to select an adequate BOD sludge load with BOD removal and stabilization of excess sludge in mind, on account of the intermediate concentrated sludge 37 that absorbs phosphorus.

The above-mentioned mechanisms and processes cause the activated sludge to absorb soluble phosphorus. The mixture liquid 39 discharged from the aeration tank which is formed after BOD has been biologically oxidized completely, is introduced into the final sedimentation tank 10 where the final solid-liquid separation process is performed. In this sedimentation tank, the activated sludge is settled, separated, and concentrated, and the treated liquid 40 is obtained. The treated liquid 40 may be discharged as such or undergo further treatment, if required.

On the other hand, the activated sludge which has been separated and concentrated by precipitation is at least partly returned to the anaerobic tank 1 through the pump 11. Returned sludge is indicated by 32. The remaining sludge 41 is discharged from the system, but may be partly returned to the aeration tank 5, if required. Short pass returned sludge is indicated by 42. In the embodiment as shown in FIG. 1, excess sludge is discharged at the final sedimentation tank 10. This is not absolutely required, and a part of the mixture liquid discharged from the aeration tank 5 may be used as excess sludge, as is often the case with some of the conventional activated sludge facilities. Also, a part of the intermediate concentrated sludge 37 obtained in the intermediate sedimentation tank 3 may be used as excess sludge. The excess sludge obtained in this case is the sludge which has released phosphorus completely in the anaerobic tank 1, and therefore it releases only a little soluble phosphorus even when it is left in the excess sludge concentration tank for a long time, with the result that back flow of phosphorus from the excess sludge treating system can be minimized.

The embodiment as shown in FIG. 1 may be changed in the details of construction without departing from the spirit and scope of the present invention.

Figure 2:
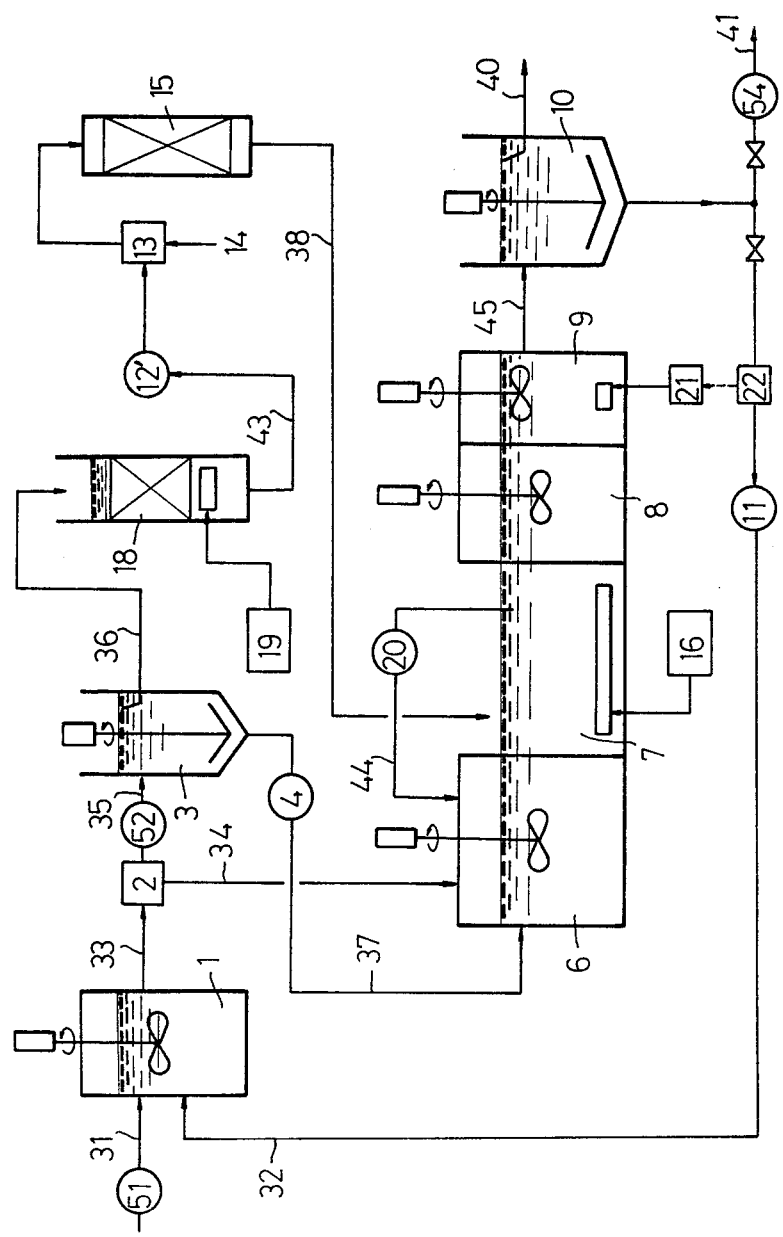
FIG. 2 is a flow sheet of the process of the present invention applied to the circulating nitrification-denitrification process.

The present invention can be applied to the nitrification-denitrification process for removing nitrogen together with BOD. In the nitrification-denitrification process, it is usually necessary to prolong the sludge age in order to prevent nitrification bacteria from being leached out. Therefore, the conventional nitrification-denitrification process cannot perform complete dephosphorization unless the waste liquid has a sufficiently high BOD/phosphorus ratio. However, the process of this invention can treat waste liquids having considerably smaller BOD/phosphorus ratios. FIG. 2 shows an embodiment completed by applying the present invention to the so-called circulating nitrification-denitrification process. The features of this embodiment are briefly described below.

In the embodiment as shown in FIG. 2, the waste liquid 31 and the returned sludge 32 enter the anaerobic tank 1 for mixing, in the same manner as in the embodiment shown in FIG. 1. In the embodiment of FIG. 2, which is intended for complete denitrification, a complete mixer will be satisfactorily used for the anaerobic tank 1 because the returned sludge 32 contains at most only a small amount of $NO_x^-$. Other requirements for the anaerobic tank 1 are the same as for the embodiment as shown in FIG. 1, and the bacteria reaction that takes place in the anaerobic tank is also the same. The mixture liquid 33 discharged from the anaerobic tank 1 is separated into the main flow mixture liquid 34 and the branched flow mixture liquid 35 by the distribution tank 2. The branched flow mixture liquid 35 is introduced to the intermediate sedimentation tank 3 for separation into the separated liquid 36 and intermediate concentrated sludge 37.

One of the differences between the embodiment shown in FIG. 1 and the embodiment shown in FIG. 2 is the process for treating the separated liquid 36. In the case of the embodiment shown in FIG. 1, the separated liquid 36 is introduced directly to the process for removing phosphorus chemically, whereas in the case of the embodiment shown in FIG. 2, the separated liquid 36 undergoes biological oxidation treatment in advance of the process for removing phosphorus chemically. In other words, the separated liquid 36 is introduced to the biological oxidation filtering tower 18 in which BOD is removed by oxidation and nitrification preferably takes place. This process is not indispensable in the process of this invention, but it is desirable in the case where a fixed bed is used for the subsequent dephosphorization tower 15 in which phosphorus is removed catalytically, because the biological oxidation prevents the occurrence of bacteria slime that causes clogging of the dephosphorization material (phosphate mineral), extending the intervals of back washing of the fixed bed. The simultaneous nitrification lowers the alkalinity of the separated liquid 36, making it possible to remove a greater amount of phosphorus with a lesser amount of calcium agent. In the embodiment shown in FIG. 2, the biological oxidation filtering tower 18 is a fixed aeration bed in which fine sand is filled and air is blown from the bottom by the blower 19. However, this is not limitative, and it is possible to use a fluidized aeration bed in which bacteria-laden fine sand is fluidized with aeration, the trickling filter, and the dipping filter.

The liquid 43 treated by biological oxidation is fed by the pump 12' into the calcium agent mixing tank 13 in which the liquid is mixed with the calcium agent 14, and the mixture liquid is passed through the fixed bed type dephosphorization tower 15, in which preferably more than 80% of the phosphorus is removed chemically. The treated liquid 38 may be discharged as such, if permitted. However, in the embodiment shown in FIG. 2, it is returned to the circulating nitrification-denitrification facility in order to completely remove a small amount of phosphorus remaining therein and $NO_x^-$ formed in the biological oxidation filtering tower 18. In this case, it may be returned to the first denitrification tank 6, the nitrification tank 7, or the second denitrification tank 8. In the embodiment shown in FIG. 2, it is returned to the nitrification tank 7. In the case where nitrification is not performed in the biological oxidation filtering tower 18, the chemically dephosphorised treated liquid 38 may be returned to the anaerobic tank 1; however, this is not preferable if nitrification is carried out and $NO_x^-$ is contained.

On the other hand, the main flow mixture liquid 34 separated by the distribution tank 2 and the intermediate concentrated sludge 37 obtained by the intermediate sedimentation tank 3 are also introduced to the circulating nitrification-denitrification facility. In this case, the main flow mixture liquid 34 should preferably be admitted into the first denitrification tank 6, but the intermediate concentrated sludge 37 may be introduced to either the first denitrification tank 6 or the nitrification tank 7.

Dephosphorization bacteria also carry out denitrification or respiration metabolism using $NO_x^-$ as a hydrogen acceptor. The activated sludge stripped of phosphorus which enters the first denitrification tank 6 uses $NO_x^-$ contained in the circulating liquid 44 which is fed to the first denitrification tank 6 from the nitrification tank 6 through circulation pump 20, whereby denitrification is performed and BOD outside cells and intracellular organic substance are biologically oxidized and simultaneously soluble phosphate external to cells is taken into cells. This phosphorus absorption reaction may finish in the first denitrification tank 6, or may be performed continuously in the subsequent nitrification tank 7 and the second denitrification tank 8, and even in the re-aeration tank 9. In these phosphorus absorption reactions, the activated sludge which contains concomitant soluble phosphorus in comparatively small quantity as compared with the phosphorus absorption capacity contained in the intermediate concentrated sludge 37, performs the same function and effect as in the embodiment shown in FIG. 1.

The first denitrification tank 6, nitrification tank 7, second denitrification tank 8, and re-aeration tank 9 may be operated in almost the same manner as in the conventional circulating nitrification-denitrification process. Although not shown in FIG. 2, it is permissible to add a carbon compound as an auxiliary hydrogen donor to the second denitrification tank 8 in order to promote denitrification. In such case, methanol is the most preferred auxiliary hydrogen donor in the present invention, because methanol is inert to dephosphorization bacteria and it does not cause phosphorus to be released again even when it is added in excess of the quantity corresponding to influent $NO_x^-$ and remains in the system.

In the conventional circulating nitrification-denitrification process, a carbon compound is often added to the first denitrification tank 6 if waste liquid having an extremely low BOD/nitrogen ratio is to be treated. In such case, the carbon compound should be added to the anaerobic tank 1 rather than the first denitrification tank 6 according to the present invention, because the carbon compound promotes release of phosphorus and, in its turn, contributes to the selection of dephosphorization bacteria. Preferable carbon compounds in such a case are ethanol, organic acids such as acetic acid, and low-molecular weight sugars rather than methanol.

In the embodiment shown in FIG. 2, DO in the nitrification tank 7 is maintained by blowing air supplied from the blower 16. The re-aeration tank 9 is hermetic and oxygen is supplied from the oxygen generator 21. Using oxygen to maintain DO in the re-aeration tank 9 has the following two advantages. First, activated sludge which is settled and concentrated very easily (the VSI is often lower than 50) can be formed. Secondly, the oxidation-reduction potential [ORP] of the activated sludge which has been precipitated and concentrated in the final sedimentation tank 10 goes down slowly and re-release of phosphorus from the activated sludge can be minimized. It is uneconomical to supply an excess amount of oxygen to the re-aeration tank 9 to increase DO excessively in the mixture liquid 45 discharged from the re-aeration tank. It also causes DO to remain in the returned sludge 32. DO remaining in the returned sludge 32 destroys the respiration-impossible state in the anaerobic tank 1. If this should occur, it might damage the selection of dephosphorization bacteria. In order to prevent such situation, the monitor 22 such as ORP meter and DO meter is attached to the sludge settling part of the final sedimentation tank 10 or the route for the returned sludge 32. The oxygen supply from the oxygen generator 2 is controlled according to output signals from the monitor. Needless to say, aeration in the re-aeration tank 9 can be accomplished with air as well as with oxygen.

The mixture liquid 45 discharged from the re-aeration tank 9 leaves the nitrification-denitrification process and is then admitted into the final sedimentation tank 10 for the final solid-liquid separation process. After precipitation and separation of activated sludge, the treated liquid 40 is obtained. The precipitated and separated activated sludge is mostly returned to the anaerobic tank 1 and is partly discharged from the system. Returned activated sludge is indicated by 32 and excess sludge is indicated by 41.

Incidentally, FIG. 1 and FIG. 2, reference numerals 51, 52, 53 and 54 denote the feed pump for waste liquid, the pump for branched flow mixture liquid, the feed pump for chemically dephosphorized treated liquid, and the drain pump for excess sludge, respectively.

The foregoing constitute features of the embodiment shown in FIG. 2, and there would be many conceivable variations and modifications of the present invention combined with the nitrification-denitrification process. Their details are not mentioned here, however.

Whether the present invention is applied to the activated sludge process as shown in FIG. 1 or to the nitrification-denitrification process as shown in FIG. 2, an important requirement for design and operation in practicing the present invention is the ratio of the quantity of phosphorus to be removed biologically and the quantity of phosphorus to be removed chemically.

The quantity of phosphorus to be removed by the anaerobic-aerobic activated sludge process is determined by the quantity of excess sludge generated and the content of phosphorus contained in the excess sludge. On the other hand, the quantity of excess sludge is a function of the quantity of BOD removed and the sludge age. Therefore, the following equation holds for the relation between the quantity of phosphorus removed and the phosphorus content.

$$\phi = \frac{1 + K\theta}{Y} \cdot \frac{\Delta P}{\Delta S} \qquad (1)$$

where
$\phi$ = phosphorus content in excess sludge [kg−P/kg−VSS]

θ = sludge age [days]
ΔP = quantity of phosphorus removed [kg−P/day]
ΔS = quantity of BOD removed [kg−BOD/day]
K = coefficient of sludge natural deactivation [−/day]
Y = coefficient for conversion of BOD to sludge [kg−VSS/kg−BOD].

The quantity of phosphorus removed biologically or the difference of the total quantity of phosphorus removed and the quantity of phosphorus removed chemically is also represented in the following equation similar to equation (1).

$$\phi = \frac{1 + K\theta}{Y} \cdot \frac{\Delta P - \Delta P_c}{\Delta S} \quad (2)$$

where $\Delta P_c$ = quantity of phosphorus removed chemically [kg−P/day]

The difference between equation (1) and equation (2) represents the essential difference between the conventional anaerobic-aerobic activated sludge process and the process of the present invention. If phosphorus is to be removed completely in the conventional process, the excess sludge or the phosphorus content in the activated sludge formed at the end of the aeration tank can be controlled only by sludge age. In the process of this invention, however, the phosphorus content can be controlled easily by adjusting the quantity of phosphorus to be removed chemically.

In the anaerobic-aerobic activated sludge process, the rate at which activated sludge absorbs phosphorus in the aeration tank is proportional to the difference between the critical phosphorus content and the phosphorus content at the specific point. Therefore, if high phosphorus absorption activity is to be maintained up to the end of the aeration tank, the phosphorus content in the excess sludge should greatly differ from the critical phosphorus content. Then, it would be possible to invariably generate the treated liquid containing phosphorus in low concentrations. According to the process of this invention, the phosphorus content in the excess sludge is not particularly specified, but it is desirable to keep it below 95%, preferably below 80%, of the critical phosphorus content. In such case, the quantity of phosphorus to be removed chemically is determined as follows from equation (3).

$$\Delta P_c = \Delta P - 0.8 \frac{Y\phi_c \Delta S}{1 + K\theta}$$

where $\phi_c$ = critical phosphorus content [kg−P/kg−VSS].

Once the quantity of phosphorus to be removed chemically is determined as above, the flow rate of the separated liquid 36 and, in turn, the flow rate of the branched flow mixture liquid 35 can be determined from the concentration of the soluble phosphorus in the separated liquid 36.

In summary, the present invention has the following advantages over the conventional anaerobic-aerobic activated sludge process: (1) Operation is not limited by the BOD/phosphorus ratio of waste liquid to be treated. (2) The sludge age can be selected as required. (3) The phosphorus absorption activity of activated sludge can be maintained up to the end of the aeration tank. (4) The treated liquid invariably contains phosphorus in sufficiently low concentrations.

The present invention is advantageous over the conventional catalytic dephosphorization process in that phosphate mineral resource can be recovered effectively from waste liquids containing phosphorus in comparatively low concentrations using a small quantity of calcium agent without performing alkalinity adjustment.

The present invention as a whole provides a process for effectively and economically removing BOD, phosphorus, and, if desired, nitrogen, from organic waste liquids such as municipal sewage containing phosphorus in low concentrations.

The following examples are given to further illustrate the present invention. The scope of the invention is not, however, meant to be limited to the specific details of the examples:

Example 1

The process of this invention was applied to the treatment of waste liquids discharged from the multiple dwelling house for the employees of EM Company in F City, after the conventional anaerobic-aerobic activated sludge process had turned out to be unsatisfactory in its verification test.

The experimental facility was substantially the same in construction as the embodiment shown in FIG. 1. The anaerobic tank consists of two serially arranged cylindrical hermetic tanks made of rigid PVC. Each tank was provided with a stiring impeller which was driven at 60 rpm by a motor with reduction gear. Each tank had a capacity of 140 liters, the total capacity being 280 liters. The intermediate sedimentation tank was also made of rigid PVC and had the shape of a circular clarifier. The diameter was about 280 mm and the capacity about 90 liters. The bottom was provided with a rake which was driven at 2 rpm by a motor with reduction gear. The rectangular aeration tank was made of steel plates and partitioned into four compartments. Each compartment has a capacity of 160 liters, and the total capacity is 640 liters. Each compartment was provided with perforated air blowing pipes through which air was blown by a small blower. The rate of aeration was 120 to 150 l/min for the entire aeration tank. The final sedimentation tank was also made of steel plates and had the shape of a circular clarifier. The diameter was about 800 mm and a capacity of about 300 liters. The bottom was provided with a rake driven at 0.5 rpm by a motor with reduction gear. Snake pumps were used to feed waste liquid and to return activated sludge, and tube pumps were used to feed the branched flow mixture liquid, intermediate concentrated sludge, and chemically dephosphorized treated liquid and to drain excess sludge. In order to control the sludge age accurately, the excess sludge was drained in the form of mixture liquid from the final compartment of the aeration tank. In such case, the sludge age is the capacity of the aeration tank divided by the quantity of sludge drained every day.

A model plant for catalytic dephosphorization process was used as the facility for removing phosphorus chemically. Since the separated liquid was small in quantity, a fixed bed type dephosphorization tower was employed. However, it was still too large to pass water round the clock, and operating time was unavoidably limited to several hours a day. The separated liquid discharged in 24 hours was stored in a 500-liter DY-LITE tank, and on the following day it was treated within several hours. The treated liquid was also stored in a 500-liter DYLITE tank and returned evenly to the first compartment of the aeration tank over 24 hours.

The samples of waste liquids to be treated and treated liquids were all collected as composite samples. The samples of separated liquids and chemically dephosphorized treated liquids were collected before and after the catalytic dephosphorization process. The samples of mixture liquid and returned sludge were taken, in general, at 9 o'clock every morning.

The above-mentioned experimental facility was operated for a long period of time at the sludge age of 5.6 days. Two experiments relating to this invention were carried out as follows:

The first experiment was carried out for 5 weeks under the flow rates as shown in Table 1.

TABLE 1

| Flow Rates in First Experiment | |
|---|---|
| Waste liquid to be treated | 4300 l/day |
| Returned sludge | 1100 l/day |
| Branched flow mixture liquid | 430 l/day |
| Intermediate concentrated sludge | 110 l/day |
| Separated liquid | 320 l/day |
| Excess sludge | 120 l/day |

Average MLSS and MLVSS at the end of the aeration tank were 3320 mg/l and 2830 mg/l, respectively, MLSS and MLVSS of the returned sludge were 16200 mg/l and 13900 mg/l, respectively, MLSS and MLVSS of the intermediate concentrated sludge were 13400 mg/l and 11120 mg/l, respectively.

On the other hand, the model plant of catalytic dephosphorization was operated under the conditions as shown in Table 2. The separated liquid discharged was all treated and returned to the aeration tank.

TABLE 2

| Operating Conditions for Catalytic Dephosphorization | |
|---|---|
| Treating rate | 150 l/h |
| Space velocity | 3 h$^{-1}$ |
| Linear velocity | 5 m/h |
| Quantity of Ca(OH)$_2$ added: | |
| For separated liquid | 150 mg/l |
| Daily consumption | 48 g/day |
| Dephosphorization tower: | |
| Filler — Phosphate rock from North America | |
| Separated liquid (after addition of calcium agent) - pH 7-10 | |

The facility was operated for 5 weeks under the above-mentioned conditions, and samples were collected from the waste liquid to be treated, treated liquid, separated liquid, and catalytic dephosphorization treated liquid over the last 12 days. The average analytical values are shown in Table 3. The results were substantially satisfactory.

TABLE 3

| | Average Analytical Values in First Experiment (Unit: mg/l) | | | |
|---|---|---|---|---|
| | Waste liquid to be treated | Treated liquid | Separated liquid | Catalytic dephosphorization treated liquid |
| Total BOD$_5$ | 132 | 8.3 | 35.0 | 28.0 |
| Dissolved BOD$_5$ | 58 | 4.1 | 23.0 | 20.5 |
| COD$_{Mn}$ | 56 | 6.5 | — | — |
| SS | 72 | 7.2 | — | — |
| Total phosphorus | 6.7 | 0.50 | 30.2 | 4.3 |
| Soluble phosphorus | 4.8 | 0.12 | 28.3 | 2.3 |

The phosphorus content of the excess sludge drained from the end of the aeration tank was maintained at 52 to 55 mg−P/g−VSS in this period. The phosphorus content in the mixture liquid discharged from the anaerobic tank was 43 to 45 mg−P/g−VSS, which was about 20% lower than that in the excess sludge. With regard to the phosphorus balance the total quantity of incoming phosphorus was 28.8 g/day and the total quantity of outgoing phosphorus was 2.2 g/day, with the removal ratio being 92%. Out of the 26.6 g/day of the total phosphorus removed in the system, 8.3 g/day or the 30% was removed by the catalytic dephosphorization process. Thus, it follows that a quantity of 18.3 g/day was drained together with the excess sludge, since the excess sludge was drained at a rate of 340 g/day on an average. It is calculated from this rate that the phosphorus content in excess sludge is 53 mg−P/g−VSS, which agrees well with the above-mentioned analytical results.

In this period, the concentrations of soluble phosphorus contained in the mixture liquid discharged from the anaerobic tank and the mixture liquids in the first to fourth compartment of the aeration tank were determined to be 26.5, 10.2, 4.2, 0.2, and 0.1 mg/l, respectively. This suggests that the absorption of phosphorus was almost completed in the third compartment of the aeration tank.

In the second experiment, the quantity of branched flow mixture liquid, the quantity of separated liquid, and the quantity of phosphorus chemically removed were increased. The flow rates are shown in Table 4.

TABLE 4

| Flow Rates in Second Experiment | |
|---|---|
| Waste liquid to be treated | 4300 l/day |
| Returned sludge | 1100 l/day |
| Branched flow mixture liquid | 850 l/day |
| Intermediate concentrated sludge | 250 l/day |
| Separated liquid | 600 l/day |
| Excess sludge | 120 l/day |

In the second experiment, MLSS and MLVSS of the aeration tank and returned sludge were almost the same as those in the first experiment, but the sludge concentration in the intermediate concentrated sludge was slightly lower. This is shown in Table 5.

TABLE 5

| | MLSS and MLVSS | |
|---|---|---|
| | MLSS (mg/l) | MLVSS (mg/l) |
| Mixture liquid in aeration tank | 3200 | 2770 |
| Returned sludge | 16100 | 13600 |
| Intermediate concentrated sludge | 11000 | 9400 |

The conditions for the catalytic dephosphorization process remained unchanged but the treated quantity was increased, and therefore the daily consumption of Ca(OH)$_2$ was increased to 90 g/day.

The average analytical values in the second experiment are shown in Table 6.

TABLE 6

Average Analytical Values in Second Experiment
(Unit: mg/l)

| | Waste liquid to be treated | Treated liquid | Separated liquid | Catalytic dephosphorization treated liquid |
|---|---|---|---|---|
| Total BOD$_5$ | 140 | 8.0 | 33.0 | 30.0 |
| Dissolved BOD$_5$ | 55 | 3.2 | 20.0 | 18.0 |
| COD$_{Mn}$ | 62 | 7.0 | — | — |
| SS | 68 | 5.5 | — | — |
| Total phosphorus | 7.0 | 0.45 | 27.4 | 3.9 |
| Soluble phosphorus | 4.1 | 0.13 | 25.0 | 1.8 |

No significant difference from the first experiment was observed in the result of treatment. However, it is to be noted that the phosphorus content in the excess sludge was very low—42 to 45 mg−P/g−VSS, and the phosphorus release in the anaerobic tank was slightly low. On the other hand, the phosphorus absorption in the aeration tank was faster as compared with the first experiment. The concentrations of soluble phosphorus contained in the mixture liquid discharged from the anaerobic tank and the mixture liquids in the first to fourth compartments of the aeration tank were determined to be 23.8, 5.9, 0.1, 0.1, and 0.1 mg/l, respectively. This suggests that the absorption of phosphorus was almost completed in the second compartment of the aeration tank.

In both the first and second experiments, the quantity of Ca(OH)$_2$ added to the catalytic dephosphorization process was fixed at 150 mg/l for the separated liquid. This quantity is about 2.5 times (in mol) the quantity of phosphorus contained in the separated liquid. This quantity is equivalent to 11 mg/l in the first experiment and 21 mg/l in the second experiment when it is converted to the quantity per unit volume of waste liquid to be treated. The quantities added in either experiments are much less than in the case where the secondary treated water of municipal sewage undergoes directly catalytic dephosphorization process.

For the purpose of comparison, Table 7 shows the results of the experiment using the conventional anaerobic-aerobic activated sludge process, which was carried out in advance of the experiments in this example. The flow rate conditions were exactly the same as those in the above-mentioned two experiments.

TABLE 7

Results of Operation with Conventional
Anaerobic-aerobic Activated Sludge Process
(Unit: mg/l)

| | Waste liquid to be treated | Treated liquid |
|---|---|---|
| Total BOD$_5$ | 137 | 8.8 |
| Dissolved BOD$_5$ | 52 | 5.0 |
| COD$_{Mn}$ | 60 | 7.0 |
| SS | 75 | 5.8 |
| Total phosphorus | 6.8 | 2.2 |
| Soluble phosphorus | 4.8 | 1.9 |

The phosphorus content in the excess sludge was 60 to 61 mg−P/g−VSS, and no further increase was observed. The concentrations of soluble phosphorus in the mixture liquid discharged from the anaerobic tank and in the mixture liquids of the first to fourth compartments of the aeration tank were 30.2, 14.3, 5.2, 1.9, and 1.8 mg/l, respectively. This suggests that phosphorus absorption takes place at a very high rate in the first and second compartments, but phosphorus absorption stops in the third and subsequent compartments even though the phosphorus is present in large quantity.

Example 2

Following the two experiments in Example 1, the third experiment was carried out in this Example using the apparatus shown in FIG. 2 in which the nitrification-denitrification process is included. The nitrification tank was substituted for the aeration tank used in the first and second experiments, and the first denitrification tank and the second denitrification tank with reaeration tank were newly constructed. These tanks were made of steel plates and were rectangular and hermetic, each tank being partitioned into three compartments, each compartment having a capacity of 160 liters and the total capacity being 480 liters. The last compartment of the second denitrification tank with re-aeration tank was isolated from the other compartments even at the gas phase section. It was used as a re-aeration tank with oxygen, and the preceding two compartments were used as the second denitrification tank. Agitation and mixing of the liquid in each denitrification tank was accomplished by blowing the generated gas which was circulated by an air pump. The re-aeration tank was stirred by blowing oxygen supplied at a constant rate from an oxygen bomb, so that mixing/agitation and dissolution of oxygen were accomplished simultaneously. A sand piper pump was used as the pump circulating the liquid from the nitrification tank to the first denitrification tank. Methanol was used as the auxiliary hydrogen donor for the second denitrification tank. A small tube pump was used to supply the methanol. Other components used in the first experiment were diverted to the second experiment. The experimental apparatus used in this Example was different from that as shown in FIG. 2 in that the separated liquid directly underwent catalytic dephosphorization without undergoing biological oxidation, and the treated liquid was admitted into the first compartment of the nitrification tank.

The third experiment was carried out for 18 weeks with the above-mentioned apparatus. Table 8 shows the flow rate conditions in the 3 weeks during which the following data was collected.

TABLE 8

| Flow Rates in Third Experiment | |
|---|---|
| Waste liquid to be treated | 4300 l/day |
| Returned sludge | 1500 l/day |
| Branched flow mixture liquid | 870 l/day |
| Excess sludge | 50 l/day |
| Intermediate concentrated sludge | 250 l/day |
| Separated liquid | 520 l/day |
| Circulating liquid | 12000 l/day |
| Methanol | 90 g/day |

The activated sludge obtained in this experiment was very good in the properties of precipitation and concentration. The average values of MLSS and MLVSS of returned sludge were 21500 mg/l and 16600 mg/l, respectively. Consequently, despite the fact that the return ratio was as low as 35%, MLSS and MLVSS of the mixture liquid at the end of the nitrification tank were about 5380 mg/l and about 4200 mg/l, respectively. On the other hand, MLSS and MLVSS in the intermediate concentrated sludge were 18900 mg/l and 14500 mg/l, respectively. The flow rate of excess sludge was determined by calculating the sludge age sufficient for complete nitrification. The sludge age of about 13 days was determined from the quantity of sludge held in the nitrification tank. The operating conditions for the catalytic dephosphorization process were fundamentally the same as those used in the first and second experiments, except that the quantity of $Ca(OH)_2$ to be added to the separated liquid was increased to 180 mg/l because the concentration of phosphorus in the separated liquid was slightly higher as compared with the first and second experiments. As a result, the daily consumption of $Ca(OH)_2$ was 95 g/day.

Table 9 shows the average analytical values obtained under the above-mentioned conditions for samples collected from the waste liquid to be treated, centrifuged supernatant liquid of mixture liquid at end of the nitrification tank (nitrified liquid), treated liquid, separated liquid, and catalytic dephosphorization treated liquid. The resulting treated liquid was satisfactory with respect to water quality including such items as BOD, phosphorus, and nitrogen. The phosphorus content in the excess sludge was about 58 mg−P/g−VSS, which is higher than in the second experiment, but phosphorus absorption was almost complete at the end of the nitrification tank, as shown in Table 10. Phosphorus release from sludge was slightly observed in the second denitrification tank, but the released phosphorus was absorbed completely in the re-aeration tank. The calculated phosphorus balance indicates that 57% of incoming phosphorus should have been removed by the catalytic dephosphorization process, and the remainder should have been discharged from the system together with excess sludge. Thus, the weight of catalytic dephosphorization process was high in this example because the excess sludge had to be reduced under such an operating condition that the sludge age was extended in order to accomplish complete nitrification. Although no confirmatory experiment was carried out, the concentration of phosphorus in the treated liquid would have been much higher if the catalytic dephosphorization process had been omitted in the third experiment.

TABLE 9

Average Analytical Values in Third Experiment
(Unit: mg/l)

|  | Waste liquid to be treated | Nitrified liquid | Treated liquid | Separated liquid | Catalytic dephosphorization treated liquid |
|---|---|---|---|---|---|
| Total BOD$_5$ | 140 | — | 6.2 | 30.5 | 26.0 |
| Dissolved BOD$_5$ | 62 | 3.2 | 3.1 | 20.0 | 18.5 |
| COD$_{Mn}$ | 60 | — | 6.2 | — | — |
| SS | 82 | — | 6.0 | — | — |
| Total phosphorus | 6.9 | 0.22 | 0.62 | 36.0 | 3.1 |
| Soluble phosphorus | 5.1 | 0.13 | 0.11 | 32.8 | 1.8 |
| NH$_3$—N | 12.3 | N.D. | N.D. | 13.7 | 14.0 |
| NO$_x$—N | N.D. | 4.2 | 0.7 | N.D. | N.D. |

TABLE 9-continued

Average Analytical Values in Third Experiment
(Unit: mg/l)

|  | Waste liquid to be treated | Nitrified liquid | Treated liquid | Separated liquid | Catalytic dephosphorization treated liquid |
|---|---|---|---|---|---|
| Total N | 21.0 | 5.2 | 2.1 | 16.0 | 16.1 |

Note:
N.D. . . . Not detected

TABLE 10

Concentrations of Soluble Phosphorus in Mixture Liquids in Tanks in Third Experiment
(Unit: mg/l)

| | |
|---|---|
| Liquid discharged from anaerobic tank | 33.0 |
| First denitrification tank: | |
| 1st compartment | 7.2 |
| 2nd compartment | 4.1 |
| 3rd compartment | 2.3 |
| Nitrification tank: | |
| 1st compartment | 1.0 |
| 2nd compartment | 0.45 |
| 3rd compartment | 0.22 |
| 4th compartment | 0.12 |
| Second denitrification tank: | |
| 1st compartment | 0.17 |
| 2nd compartment | 0.22 |
| Re-aeration tank | 0.13 |

While the invention has been illustrated in particular with respect to BOD, phosphorus and nitrogen removal of specific sewage, it is apparent that variations and modifications of the invention can be made without departing from the spirit or scope of the invention.

What is claimed is:

1. Method of removing phosphorus and BOD from waste water containing the same, which comprises:
   in a first stage mixing under anaerobic conditions said waste water with a recycled activated sludge which is formed in a subsequent stages of said method, said recycled activated sludge being substantially free of dissolved oxygen, nitric acid and nitrous acid to form a mixture of liquid rich in soluble phosphorus and an activated sludge low in phosphorus;
   in a second stage dividing said mixture from said first stage into a major first portion and a minor second portion;
   in a third stage subjecting said second portion from the second stage to separation into a solids portion constituting a first concentrated activated sludge and a liquid portion which is rich in soluble phosphorus;
   in a fourth stage subjecting said first portion from said second stage and said first concentrated sludge from said third stage to aerobic oxidation at a pH of about 6.0–9.0, to biologically oxidize the organic substances contained therein and remove said BOD, the soluble phosphorus contained therein being absorbed by said first concentrated activated sludge, thus forming a further mixture;
   in a fifth stage separating the further mixture from the fourth stage into a liquid portion and a second concentrated activated sludge portion and recycling a portion of said second concentrated activated sludge to said first stage to form said mixture; and in a sixth stage subjecting said liquid portion from said third stage to chemical dephosphorization to remove at least a portion of the phosphorus therefrom and thus form a liquid having a reduced phosphorus content.

2. Method according to claim 1 wherein said fourth stage further includes the step of subjecting said first portion from said second stage and said first concentrated activated sludge from said third stage to denitrification.

3. Method according to claim 1 wherein at least a portion of said liquid having a reduced phosphorus content from the sixth stage is introduced into the fourth stage.

4. Method according to claim 1 wherein said liquid rich in soluble phosphorus from the third stage is contacted with phosphate minerals containing calcium phosphate at pH6–11 in the presence of calcium ions in said sixth stage to remove said soluble phosphorus from said liquid.

5. Method according to claim 1 wherein said liquid rich in soluble phosphorus from the third stage is subjected to biological oxidation prior to chemical dephosphorization.

6. Method according to claim 1 wherein said liquid rich in soluble phosphorus from the third stage is subjected to biological oxidation simultaneously with nitrification prior to chemical dephosphorization.

7. Method according to claim 1 wherein in the fourth stage said first concentrated activated sludge from the third stage, said first liquid portion from the second stage and a recycled portion of said second activated sludge from the fifth stage are mixed with oxygen, in the presence of nitric acid or nitrous acid, with the organic substances contained therein being subject to biological oxidation so that soluble phosphorus contained in the mixture is absorbed in the activated sludge therein.

8. Method according to claim 1 wherein the aerobic oxidation is effected at pH6.5–8.5.

9. Method according to claim 1 wherein said chemical dephosphorization is a coagulating sedimentation process wherein coagulation is effected by ferric chlorid, aluminum sulphate or slaked lime as coagulant.

10. Method according to claim 1 wherein said chemical dephosphorization is a catalytic dephosphorization which is effected by the addition of calcium hydroxide or calcium chloride to said liquid portion from said third stage.

* * * * *